Oct. 25, 1960 A. W. BEATTY 2,957,229
METHOD OF FABRICATING CURVED FITTINGS
Filed Dec. 23, 1954 8 Sheets-Sheet 1
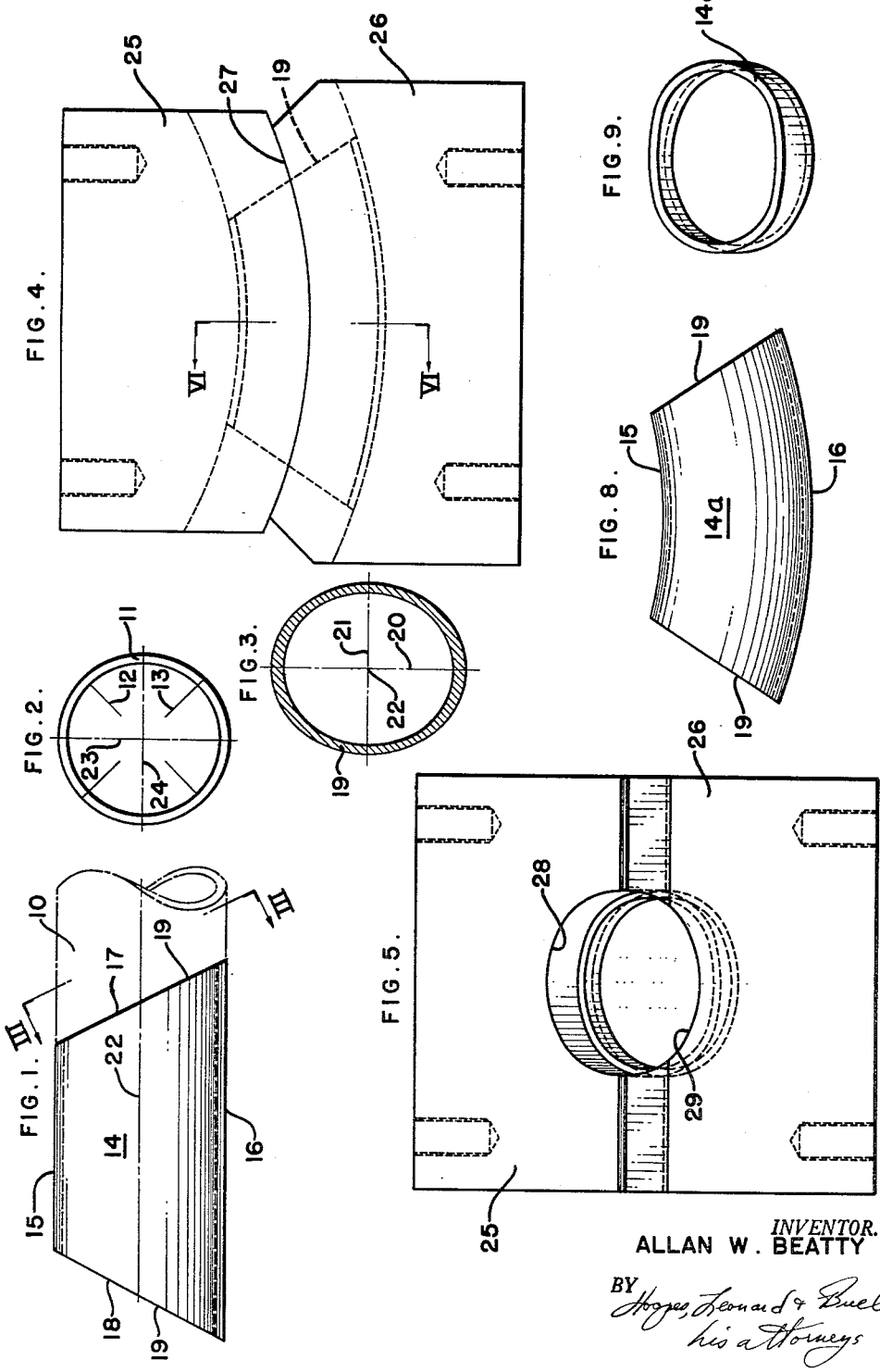
INVENTOR.
ALLAN W. BEATTY
BY
his attorneys Oct. 25, 1960 A. W. BEATTY 2,957,229
METHOD OF FABRICATING CURVED FITTINGS
Filed Dec. 23, 1954 8 Sheets-Sheet 2

INVENTOR
ALLAN W. BEATTY
BY
his attorneys

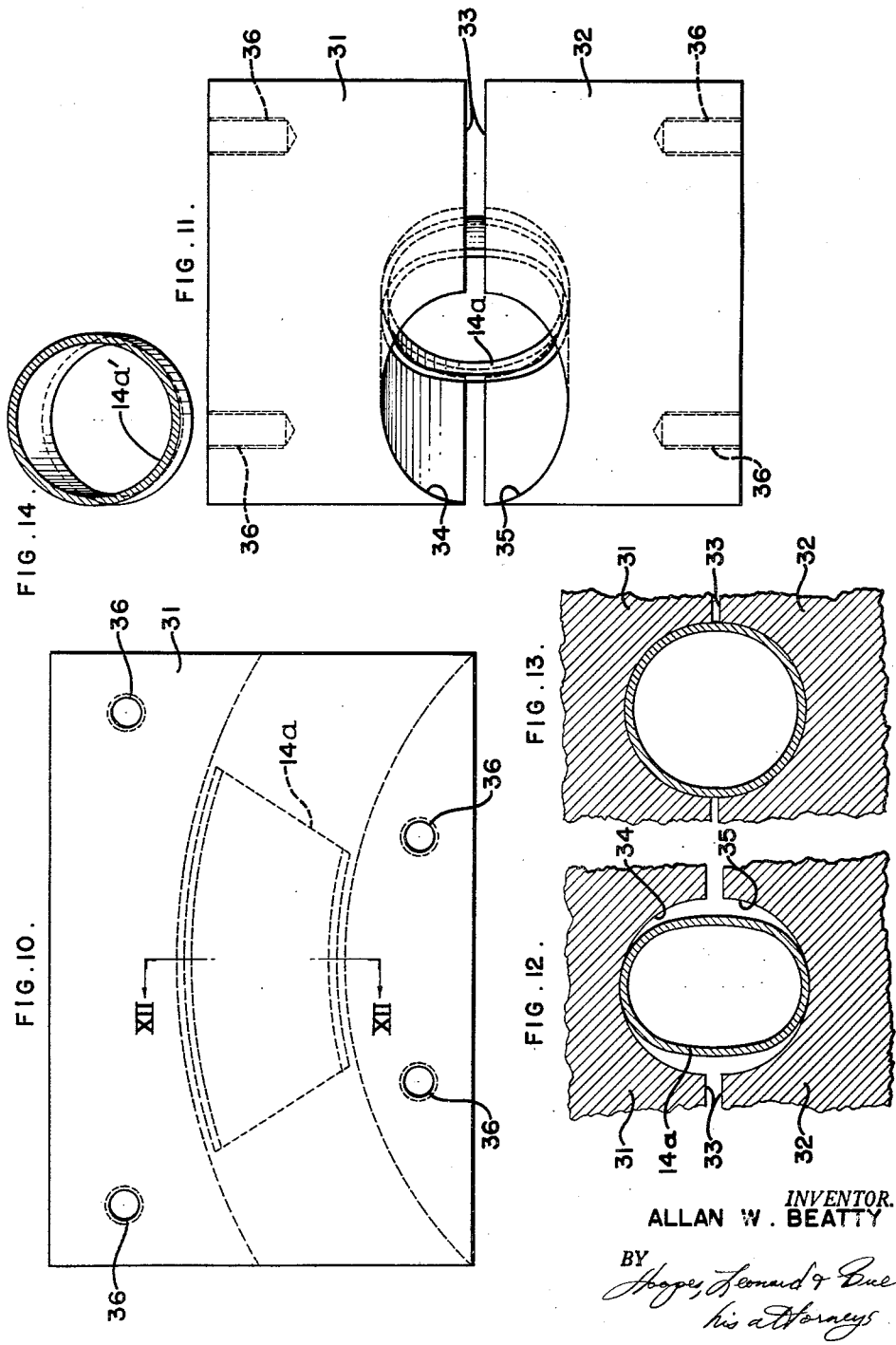

Oct. 25, 1960  A. W. BEATTY  2,957,229
METHOD OF FABRICATING CURVED FITTINGS
Filed Dec. 23, 1954  8 Sheets-Sheet 4

INVENTOR.
ALLAN W. BEATTY
BY
Hoopes, Leonard & Buell
his attorneys

Oct. 25, 1960 A. W. BEATTY 2,957,229
METHOD OF FABRICATING CURVED FITTINGS
Filed Dec. 23, 1954 8 Sheets-Sheet 5
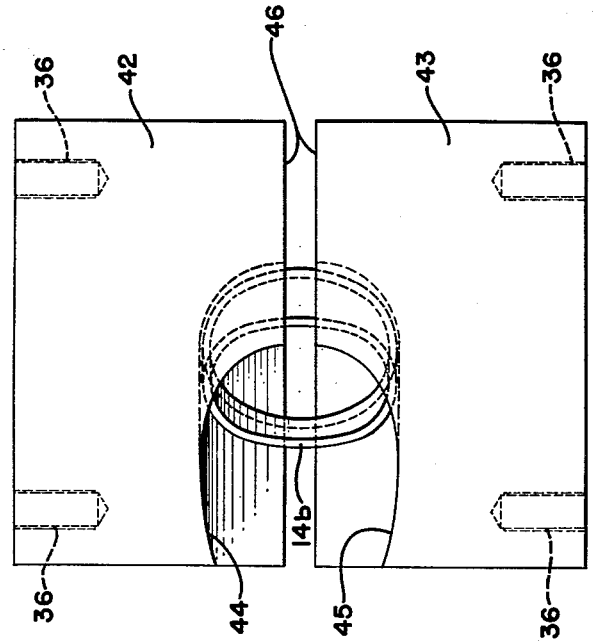
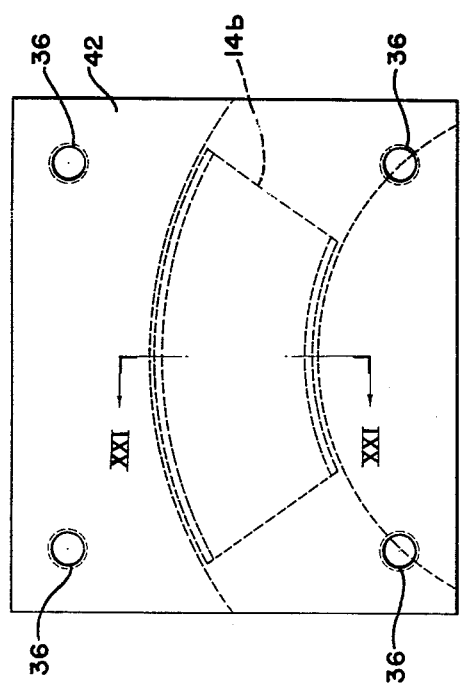
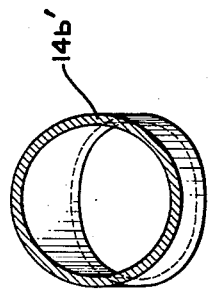
INVENTOR.
ALLAN W. BEATTY
BY
his attorneys Oct. 25, 1960　　　　　A. W. BEATTY　　　　2,957,229
METHOD OF FABRICATING CURVED FITTINGS
Filed Dec. 23, 1954　　　　　　　　　　　　　8 Sheets-Sheet 6
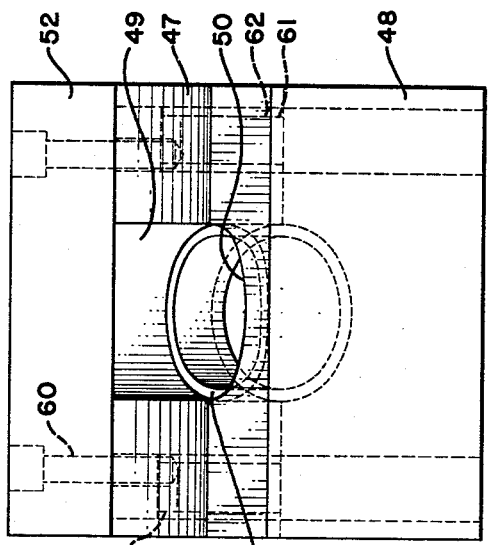
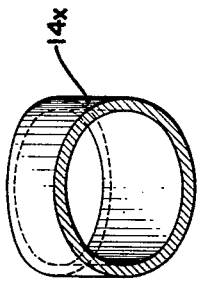
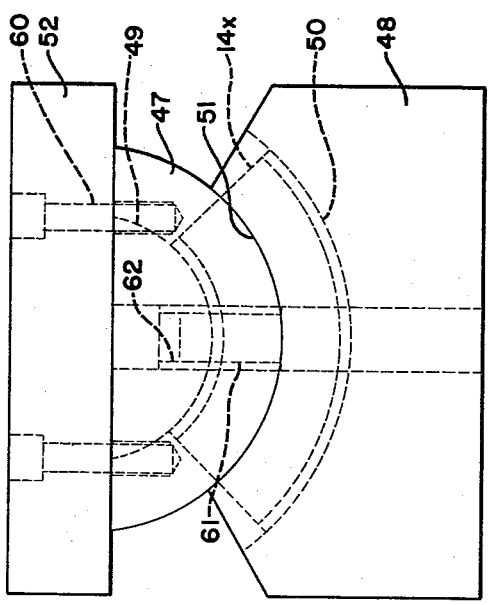
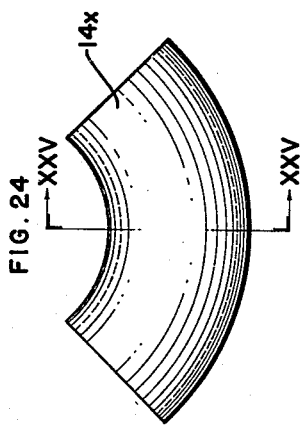
INVENTOR.
ALLAN W. BEATTY
BY
Hooges, Leonard & Buell
his attorneys Oct. 25, 1960     A. W. BEATTY     2,957,229
METHOD OF FABRICATING CURVED FITTINGS Filed Dec. 23, 1954     8 Sheets-Sheet 7

*INVENTOR.*
ALLAN W. BEATTY

BY Hoopes Leonard & Buell
his attorneys

Oct. 25, 1960　　　　A. W. BEATTY　　　　2,957,229
METHOD OF FABRICATING CURVED FITTINGS
Filed Dec. 23, 1954　　　　　　　　　　8 Sheets—Sheet 8

INVENTOR.
ALLAN W. BEATTY

United States Patent Office 2,957,229
Patented Oct. 25, 1960

2,957,229
METHOD OF FABRICATING CURVED FITTINGS
Allan W. Beatty, Franklin Township, Allegheny County, Pa. (% Welding Fittings Corp., New Castle, Pa.)
Filed Dec. 23, 1954, Ser. No. 477,321
5 Claims. (Cl. 29—157)

This application is in part a continuation of my co-pending application Serial No. 284,805, filed April 28, 1952 now Patent No. 2,771,665.

This invention relates to the manufacture of curved fittings. More particularly, it pertains to the manufacture of fittings like elbows and bends from tubular material by means of a new combination of shaping and reducing steps thereon.

In the formation of curved fittings, such as elbows, from pipe stock, a number of prior practices have existed. In one common prior practice, a length of pipe was bent between a wheel and a shoe with the inside of the pipe occuplied by a mandrel or filled to maintain roundness. That practice has a number of disadvantages. Thus, the wall thickness on the long radius side of a fitting so formed stretched and became thin. The difference in wall thickness often prevented any warranty as to minimum thickness. It also caused welding problems because of thickness variations at the ends of fittings so formed. In addition, both the inside and outside surface of the pipe stock used to make such a fitting was scored or galled by the mandrel and other equipment. Such markings not only affected the appearance but were also capable of affecting fluid flows in contact with such a galled or scored surface. In addition, such marking of certain alloys increased the possibility of corrosion commencing at such scored or galled places.

It was also a usual prior practice to assist such manufacture by providing "pulling ends" on the stock. Such pulling resulted in the deformation of such ends and considerable scrap metal was left at the end of the operation to be cut off in finishing the newly formed elbow. The non-uniform wall thickness problem, particularly on the long radius side, remained in the industry and called forth various attempts to solve the problem including localized and uncertain prethickening endeavors such as that illustrated in United States Patent No. 1,225,788 which shared in disadvantages of prior practices.

In another prior practice, an internal expanding mandrel was forced through pipe stock. That practice put the metal in tension and also caused scoring and galling. Differential heating was often tried although many alloys, such as stainless steel are susceptible to damage by flame heating particularly. In still another practice, pipe stock was forced through a hollow curved die which required disadvantageous axial movement between work and die, was relatively expensive, entailed considerable rejection and provided somewhat unpredictable results in wall thickness of the fitting being manufactured.

In the present invention, the foregoing disadvantages have been overcome. Instead, a curved fitting like an elbow can be manufactured by my new process readily and conveniently by die-forming in a single action press, like a hydraulic press, with all of the work in such shaping of an external and generally compressive nature. An elbow made by my new method will have uniform wall thickness at the ends and in the finishing of such ends, no material quantity of scarp metal is to be found. The presence of uniform wall thickness at the ends of the elbows formed by my new process has the advantage that welding operations of such ends for example, can take place with other pipe with a matching of inside and outside diameters at the weld zone.

In addition, my new method produces curved fittings like elbows in which throughout the body thereof between such ends the wall thickness is full along the long radius side. Further, the wall is somewhat thickened along the short radius or crotch side of the fitting thereby providing desirable reinforcement in that crotch or short radius side. Hence, fittings made by my new process can be warranted in terms of a minimum wall thickness in every part thereof. The external work performed in my new process over the entire outer surface of stock being formed into an elbow is work of a size reducing and generally compressive nature. Thereby, there is an upsetting action in the metal of the walls of the fitting being manufactured with diameter size reduction without significant elongation of the longitudinal elements of the stock being shaped into such a curved fitting. By my new method also, scoring, galling, buckling, wrinkling, bulging, flashing and squirting out of portions of the tubular stock in the course of die-forming thereof into a curved fitting are avoided. Nor is any heating required to enable dies to shape the tubular stock material into a curved fitting, like an elbow, by my new process.

Other objects and advantages of this invention will be apparent from the following description and from the accompanying drawings, which are schematic only, in which Figure 1 is a view of a section of tubular material from which a desired length may be taken for the fabrication of curved fittings in accordance with this invention;

Figure 2 is an end view of such a length;

Figure 3 is an end view taken along line III—III of Figure 1;

Figure 4 is a view in side elevation of such length being shaped in a preferred first die-pressing step, a bowing step, of my invention;

Figure 5 is an end view of the dies and work shown in Figure 4;

Figure 8 is a view in side elevation of the bowed length following the die-pressing step shown in Figures 4 to 7;

Figure 9 is an end view of the length shown in Figure 8;

Figure 10 is a plan view of such length being shaped in a second die-pressing step, a rounding step, of this invention;

Figure 11 is a view in elevation looking at the right-hand end of Figure 10 just prior to closing of the operative parting height of the "rounding" dies shown in Figures 10 and 11;

Figure 12 is a view in section taken along line XII—XII of Figure 10 also showing the dies and workpiece at the beginning of the operative parting height therebetween;

Figure 13 is a view in section of the elements shown in Figure 12 when the dies have closed to that parting height wherein the workpiece fills the die recesses just prior to compressive upsetting of metal of the workpiece.

Figure 14 is an end view of said length following the completion of such second die-pressing step;

Figure 19 is a plan view of such length being shaped in a fourth die-pressing step, a further rounding step, of this invention;

Figure 20 is a view in elevation looking at the right-hand end of Figure 19 just prior to closing of the operative parting height of the "rounding" dies shown in Figures 19 and 20;

Figure 21 is a view of said length following the completion of said fourth die-pressing step taken along line XXI—XXI of Figure 19;

Figure 22 is a view in side elevation of such length being shaped in a fifth die-pressing step, a still further bowing step, of my invention;

Figure 23 is an end view of the dies and work shown in Figure 22;

Figure 24 is a view in side elevation of the length following such fifth die-pressing step shown in Figures 23 and 24;

Figure 25 is a view of the length shown in Figure 24 taken along line XXV—XXV of Figure 24;

Figure 6:
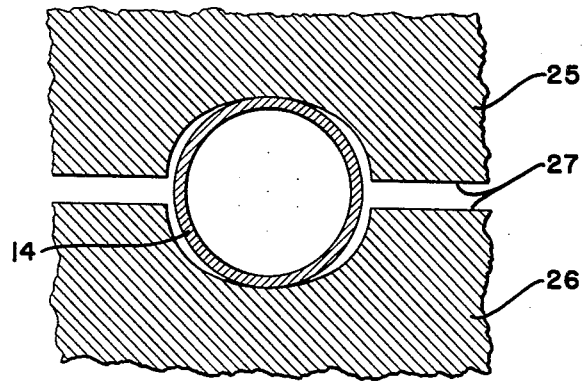
Figure 6 is a view in section taken along line VI—VI of Figure 4 showing the dies and work piece at the beginning of the operative parting height therebetween.

Referring to the drawings, a section 10 of tubular stock material, such as stainless steel pipe, is provided with an appropriate thickness of wall 11, inside diameter 12 and outside diameter 13. Such tubular stock may be seamless where a curved fitting, like an elbow, to be fabricated by this invention, is to be seamless, or it may be welded pipe. Similarly, other ferrous metals than stainless steel and ferrous alloys and other metals than ferrous metals may be employed in carrying out the invention.

The section 10 may be sawed or otherwise divided into lengths 14 in the form of a cylinder having a trapezoidal profile, as shown in Figure 1 in solid lines. That profile is formed by a shorter axial element 15 at the top of cylinder 14, a longer axial element 16 at the bottom of cylinder 14 parallel to element 15, and, by traces of the two oblique planes 17 and 18 at the ends of cylinder 14, said oblique planes being defined by the end edges 19, as shown in Figure 3. Each such end because of its obliquity has a vertical major axis 20 and a horizontal minor axis 21 passing through the central longitudinally extending axis 22 of each length 14. Intermediate such ends, such length also has a vertical transverse axis 23 and a horizontal transverse axis 24. The respective and relative dimensions of these axes in any particular curved fitting fabricated by this invention change in the course of the shaping that takes place on cylinder length 14 during such fabrication. In the illustrated practice of this invention, the oblique planes of the end edges 19 are at an angle of about 27° to the horizontal and the length 14 produces, after such fabrication, a 90° elbow having advantages provided by this invention. The terms "top," "bottom," "vertical," "horizontal," "upper" and "lower" are relative only and are utilized to facilitate the description herein. Similarly, this invention may be employed in making other curved fittings, such as other elbows and bends of predetermined diameters, wall thicknesses, radii of curvature and over-all length.

In commencing the shaping of cylinder 14 into an arcuate bowed length 14, a first die-pressing step may be employed utilizing upper bowing die 25 and lower bowing die 26. Such dies are mating dies and each is provided with a side-to-side parting surface 27 which in contact with one another extend along the median side element of length 14 about midway between the top and bottom thereof. Dies 25 and 26 are provided with complementary recesses 28 and 29. Recesses 28 and 29 are arcuate in a longitudinally extending direction about a center of curvature in a median vertical plane. Such center is nearer the short element side 15 which becomes the short radius or crotch side of the final elbow. The longer element side 16 of length 14 becomes the long radius side of such final elbow.

Transversely, the arcuate recess 28 is crowned and the arcuate recess 29 is reverse crowned so that when dies 25 and 26 are closed, as shown in Figures 4 and 5, the opening defined by the recesses 28 and 29, in transverse section, is an ellipse with its longer transverse axis extending in a horizontal position. Hence, as length 14 is shaped in such first die-pressing step, as shown in Figures 4 to 7, into the shape 14a illustrated in Figures 8 and 9, the vertical axes 20 and 23 are somewhat reduced in dimension, such reduction in any particular stage, however, being sufficient to enable the workpiece to have clearance for placement in the dies for next succeeding die-pressing step. At the same time, the longer transverse axis of the ellipse formed by the recesses 28 and 29 when surfaces 27 meet provides some increase in the horizontal axes 21 and 24 of length 14. However, the entire periphery of length 14a aggregates a length slightly less than the corresponding periphery of cylinder length 14 prior to the completion of such first die-pressing step.

Figure 30:
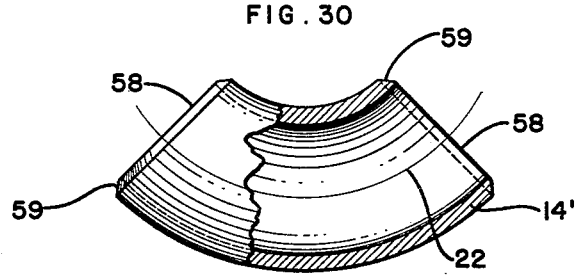
Figure 30 is a view of a finished elbow formed into final shape by die-pressing steps of this invention.

In that way, there is not only a metal displacement action but also size reduction and a compression action on length 14 in the die-pressing step illustrated in Figures 4 to 7. Such compression provides wall thickening due to upsetting of the metal in the wall 11 of the length. Thereby in this and succeeding die-pressing steps, metal for final minimal thickness is kept in the long radius side 16 while additional final thickness is built up in the short radius side without material change in the uniformity of the thickness of the ends of the length 14 when finally shaped. Moreover, by having the "bow" of recesses 28 and 29 relatively flat in a longitudinal direction in any bowing step particularly adjacent the edges 19 of length 14, my final fitting 14' will have the edges 19 as shown in Figure 30, relatively straight for ready welding or other affixation to the end of an adjoining pipe.

Figure 7:
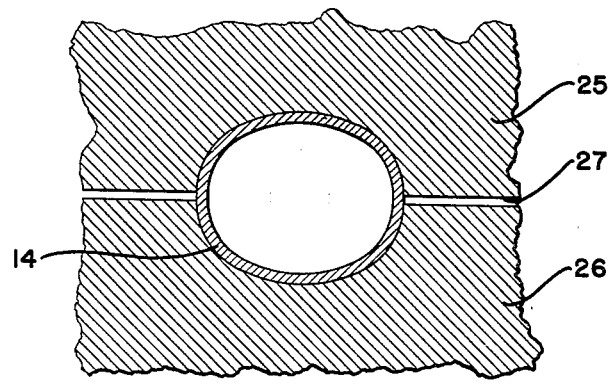
Figure 7 is a view in section of the elements shown in Figure 6 when the dies have closed to that parting height wherein the workpiece fills the die recesses just prior to compressive upsetting of metal of the workpiece.

As illustrated in Figures 6 and 7, upper and lower dies 25 and 26 come into contact with length 14 when the respective recesses 28 and 29 touch the uppermost and lowermost longitudinal elements of length 14. At that point, the parting surfaces 27 are apart a distance, as shown in Figure 6, which may be referred to as the "full" parting height or the beginning of the "operative" parting height. Approach of the respective parting surfaces 27 thereafter toward one another begins to deform the length 14 transversely in a manner such that the cross section of length 14 is reduced in height and increased in width until the periphery thereof is in metal-to-metal contact with the adjoining surface of the recesses 28 and 29 of the respective upper and lower dies 25 and 26. At that point, which is prior to the introduction of compressive stress into the metal of wall 19 of length 14, the parting surfaces 27, as shown in Figure 7, are apart a height or distance which may be termed the "upset" parting height or distance. Continued approach of the parting surfaces 27 toward one another from the upset parting height until they meet, as shown in Figures 4 and 5, will shrink the peripheral measure of the workpiece 14 and will compress metal in the wall 19 thereof and thicken it.

I have discovered that the upset parting height for the respective die-pressing steps should not be in excess of a distance about equal to the wall thickness of length 14 being pressed in a respective step if metal pinchouts and flashes are to be avoided adjoining the parting surfaces. I have also discovered that to the mean of the inside and outside finish diameter of a fitting made by my new process, I may add a distance equal to from three to four times the finish wall thickness to obtain a suitable outside diameter for the starting tubular material. As an example, for a finished length having a mean diameter of four inches and a mean wall diameter of one-eighth of an inch, the outside diameter of the starting tubular material should be between about four and three-eighths and four and one-half inches of a tubular material having about the same wall thickness as the wall thitckness of the finished article on the long radius side.

When the dies 25 and 26 are brought together, cylinder 14 is formed into a length 14 having the first die-pressed shape illustrated as 14a in Figures 8 and 9. Such shaping by dies 25 and 26 can be done on a hydraulic press in a single stroke. No longitudinal restriction is present or required nor does the interior of the tubular stock length 14 have to have anything inside it. Indeed, the length of the central axis 22 between the oblique planes 17 and 18 in the cylinder 14, as shown in Figure 1, is substantially the same as it is in the final fitting 14' before the ends are edge bevel finished in an end finishing machine. Still further, the work on the tubular stock 14 in the die-pressing operations of this invention is cold work and involves compressive work with resultant benefit.

The length 14 in its partially shaped form 14a is then positioned between rounding dies 31 and 32 respectively shown in upper and lower positions in a press. Such rounding dies have their respective parting surfaces at 33 which are "up-and-down" relative to length 14 in or parallel to the vertical plane of axes 20, 22 and 23. Recess 34 in upper die 31 and recess 35 in lower die 32 are complementary. In closure position when surfaces 33 meet, they define a circular section to restore length form 14 in form 14a to round condition, as shown in Figure 14 without bulging or squirting out of any part of the metal of length 14. At the same time, recesses 34 and 35 preserve the "bowing" arc that was provided by the first die-pressing step shown in Figures 4 to 7.

The complementary recesses 34 and 35 are respectively in crowned and reverse crowned configuraiton in cross section and are arcuate in plan, the work 14 being turned angularly about its longitudinal axis through 90° between the position shown in the first die-pressing set in Figure 4 and the position shown in the second die-pressing set in Figure 10. Thereby, the longer transverse axis of the ellipse of form 14a is reduced in dimension by the dies 31 and 32 by the closing thereof until the parting surfaces 33 meet. At the full or operative parting height between surfaces 33 as shown in Figure 12, the recesses 34 and 35 make engagement with the ends of the longer transverse ellipse axis of form 14a. Continued approach of the surfaces 33 toward one another shortens that longer ellipse axis and lengthens the shorter ellipse axis of form 14a until the outer surface of length 14a is in metal-to-metal contact with the respective surfaces of recesses 34 and 35. At that point, as shown in Figure 13, the parting surfaces 33 are spaced apart by a distance equal to the upset parting height. Further continued approach of the parting surfaces 33 toward one another changes form 14a into form 14a', the peripheral dimension of which is somewhat less than the peripheral dimensions of the length 14 in its form 14a. At the same time, metal in the region adjoining the parting surfaces 33 shown in Figure 13 is especially subjected to compressive upset and thickening with beneficial results hereinabove described. Preferably the approach of the dies toward one another until the parting surfaces meet is continuous in each of the die-pressing steps.

Thus, the closure of dies 31 and 32 shapes length 14 into the rounded form 14a' shown in Figure 14 and constitutes with the bowing or bending step of Figures 4 and 5 a pair of die-pressing steps which when repeated a suitable number of times provides the new method of this invention for producing curved fittings, like elbows and return bends. As dies 31 and 32 close in a press stroke, the horizontal axes 21 and 22 are reduced in dimension, horizontal axis 24, which is in a vertical position in Figure 11, being returned to a length equal to vertical axis 23. In addition, the peripheral dimension of the complementary recesses 34 and 35 when dies 31 and 32 are closed is preferably slightly smaller than the corresponding peripheral dimension of the dies 28 and 29 for the above stated purposes. Such reductions in the cross-sectional area of length 14 provided by my new method occur without "thinning" of the long radius side 16 with eventual reinforcing thickening in the short radius side 15. Moreover, the new sequence of pairs of bowing and rounding steps in controlled relatively uniform increments provides a final curved fitting of proper size of warrantable minimum wall thickness and with uniform wall thickness at the ends 19 without scrap metal or malformation at such ends.

When the dies 31 and 32 have been closed, the pressure is then released and the dies separated so that the length 14 in its form 14a' can be removed for a next or third die-pressing step of this process. The various dies used in the illustrated practice of my new method may be appropriately aligned and fastened by drilled and tapped holes 36 to the upper and lower platens of a suitable hydraulic press (not illustrated).

Figure 16:
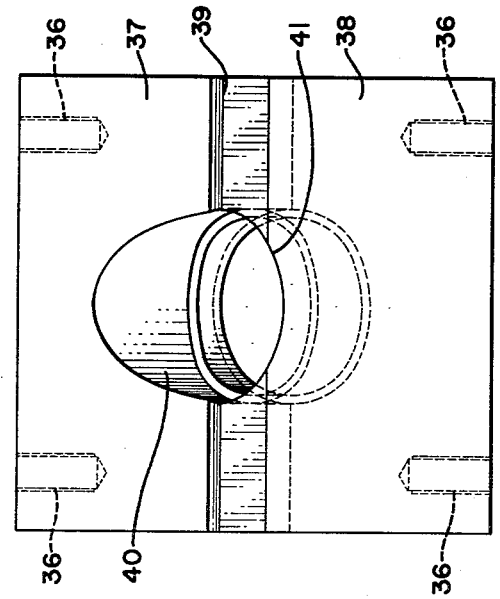
Figure 16 is an end view of the dies and work shown in Figure 15 following such third die-pressing step.
Figure 18:
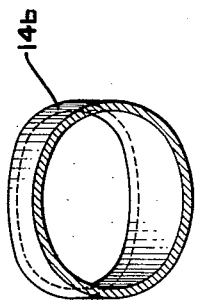
Figure 18 is a view taken along line XIII—XIII of Figure 12.
Figure 15:
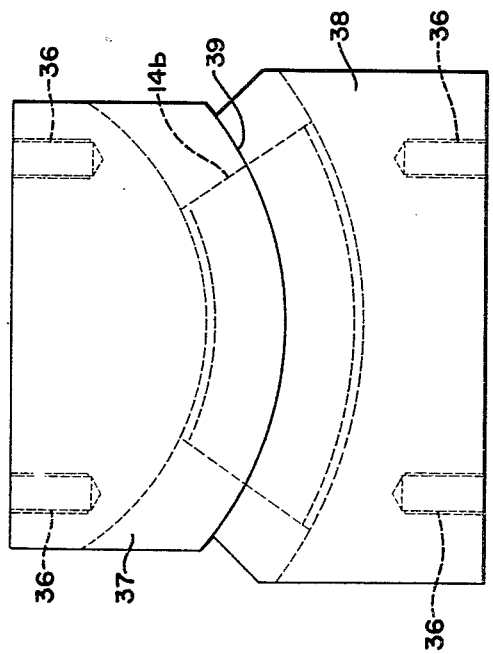
Figure 15 is a view in side elevation of said length undergoing a third die-pressing step, a further bowing step, in this invention.
Figure 17:
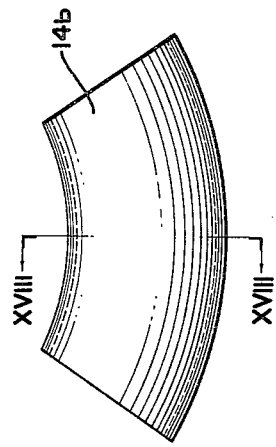
Figure 17 is a view in side elevation of the length following such third die-pressing step shown in Figures 15 and 16.

A second "bowing" set of dies 37 and 38 shown in Figures 15 and 16 operates in the same manner as the first die-pressing set of dies 25 and 26 which are shown in Figures 4 to 7. However, dies 37 and 38 by decreasing the radius of curvature press form 14a' in a manner to increase the bowing thereof and the respective recesses 40 and 41 in dies 37 and 38 still further reduce the cross section of form 14a' of length 14. Thus, length 14 in the form 14b, produced by the dies 37 and 38 when they meet at parting line 39 when parting surfaces 39 contact one another, has a shorter radius of curvature with its oblique planes at the ends more nearly approach toward coincidence. In such fabrication, further compressive upset work is performed on the metal of length 14 with thickening of wall 11 especially in the region adjoining parting surfaces 39. In the course of such bowing or bending step, an oval or elliptical shape cross section as shown in Figure 18 is again produced with the horizontal axis being greater and with the periphery of the form 14b being in the aggregate slightly shorter than the periphery of the length 14 in the form 14a'. Similarly, the peripheral dimension of the recesses 40 and 41 when the dies 37 and 38 are closed is somewhat less than the aggregate peripheral dimension of the dies 34 and 35.

A fourth die set is shown in Figures 19 and 20 and comprises upper die 42 and lower die 43 with recesses 44 and 45 respectively therein. The action of dies 42 and 43 complements the third step and rounds the shape 14b to produce a form 14b' of length 14 in a further carrying forward of the new fabrication method of this invention. In such rounding, the structure shown in Figures 19 and 20 acts in the manner described in connection with the dies shown in Figures 10 and 11, except that again there is a progression by means of the dies 42 and 43 as they close to bring their parting surfaces 46 together which not only rounds but also toward effects a further decrease in the cross-sectional area of the length 14.

In some cases, the composition of the metal workpiece being so shaped, in accordance with my new method, is such that either a standard annealing operation or other annealing operation to overcome work hardening may be desirable. In that event, a length 14, for example, after being removed from a die-pressing step may be placed in an annealing furnace for such purpose. The interposition of an annealing operation does not affect the advantages and new results produced by my new method for fabricating curved fittings like elbows and returns. It is also pointed out that the recesses in the respective dies utilized in practicing this invention have no undercut and no unrelieved surfaces in the sense of being without sufficient "draft" quality to enable a length 14 to be readily removed from such dies when they are opened following a die-pressing operation. In furtherance thereof, all of the parting lines on the up-and-down dies such as the first and third die sets are on the "horizontal" plane containing the axis 22 of the length 14 which axis begins as a straight line and is increasingly arcuate as the bowing of a length 14 proceeds. On the other hand, all of the side-to-side rounding dies have their parting lines in the longitudinal vertical center plane of each length 14, said plane being flat and including the central longitudinal axis 22 irrespective of the extent of the bowing thereof during fabrication.

From four to six such die-pressing stages as described above may be sufficient in the fabrication of elbows and returns where the tubular starting material is relatively heavy. With moderate starting wall thicknesses, from four to eight die-pressing sets, which would constitute from two to four pairs of successive bowing and rounding pressings, may be required. With still thinner tubular material as a starting stock, additional die-pressing steps may be required to avoid over-compression of metal in any step.

In a final pair of bowing and rounding steps, the final bending of a length 14 for an elbow provides that length with a curve which in side elevation preferably approximates the arc of a circle. Thus, in Figures 22 and 23, dies 47 and 48 have recesses 49 and 50 respectively, which bend a length 14 in partially fabricated form, like form 14b' into a circular arcuate form 14x. The parting surface meeting line 51 of the dies 47 and 48 may also be circular as in the illustrated embodiment to generally coincide in side elevation with center axis 22 of length 14x. Die 47 may be affixed to a die holder 52 by bolts 60. The alignment of dies 47 and 48 may be provided in an alternate manner by utilizing registry pins 61 on the block for die 48 to each side of recess 50 for entry into openings 62 in the die block for die 47 to each side of recess 49.

The operation of dies 47 and 48 is similar to the operation of the first-described set of bowing dies shown in Figures 4 to 7 and to the operation of the third set of dies, being the second bowing set, shown in Figures 15 and 16. The closure of the dies 47 and 48 described above produce the form 14x in length 14 as shown in Figures 24 and 25. Form 14x therefore, for the purposes of my illustrated practice, is in final "bowed" form for a 90° elbow which however still requires "rounding" for completion of a die-pressing fabrication in accordance with this invention.

Figure 26:
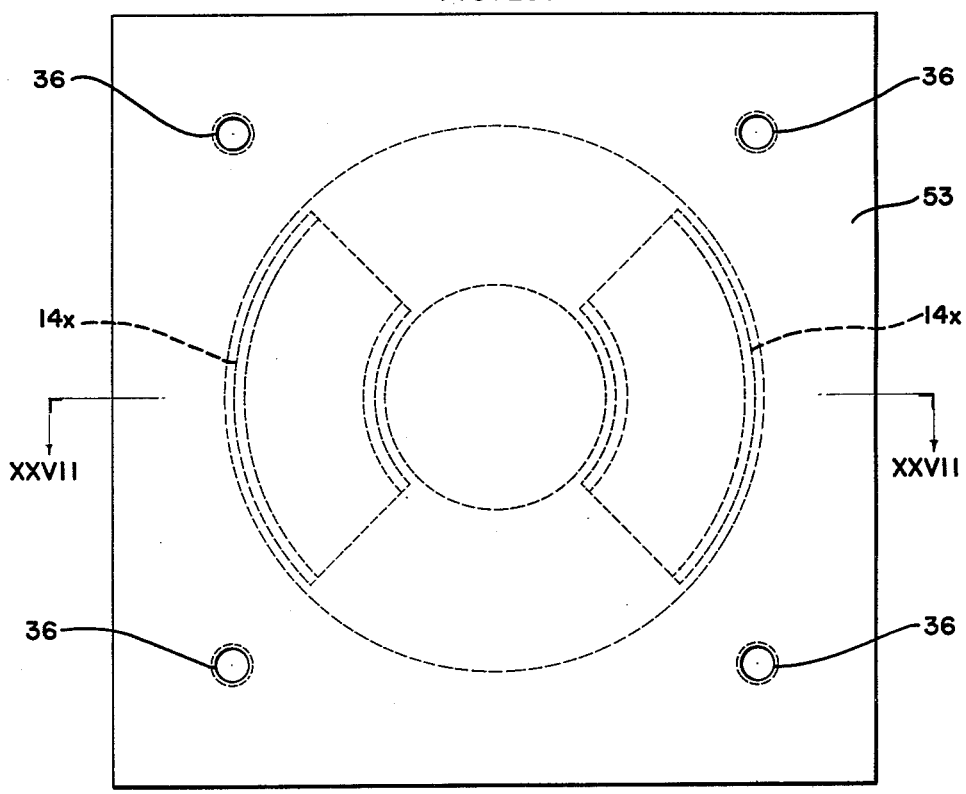
Figure 26 is a plan view of a sixth die-pressing step, a still further rounding step, of my invention.

A final rounding die-pressing set for the illustrated practice may comprise an upper side-to-side die 53 and a lower side-to-side die 54 with semicircular recesses 55 and 56, respectively. By such provision, such a final "rounding" die-pressing operation may die press more than one length in form 14x in a single press stroke, as shown in Figure 26, wherein two lengths 14x are undergoing die-pressing between the surfaces of recesses 55 and 56, such die-pressing being completed when the parting surfaces 57 meet. Such a closure of the dies 53 and 54 from operative parting height shown in Figure 27 through the upset parting height to meeting contact of surfaces 57 changes form 14x into the form 14x' as shown in Figures 26 to 29. Preferably, dies 53 and 54 also perform both rounding of this invention and cross-sectional reduction by having the aggregate periphery of the recesses 55 and 56 somewhat less in length than the length of the aggregate periphery of the recesses 49 and 50, said peripheries being measured in a plane normal to the central axis 22. The rounding operation of the dies 53 and 54 is similar to the rounding operations produced by the die-pressing sets shown in Figures 10 and 11, and, in Figures 19 and 20, respectively.

Figure 28:
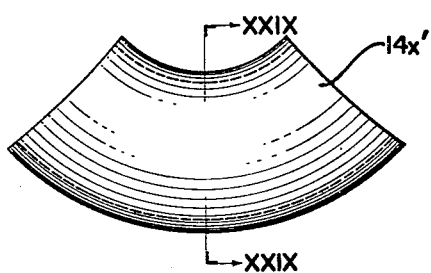
Figure 28 is a view in side elevation of the length following the completion of such sixth die-pressing step shown in Figures 27 and 28.
Figure 29:
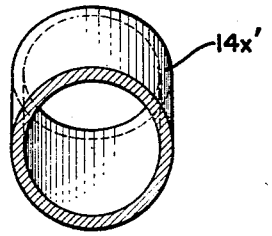
Figure 29 is a view of the length shown in Figure 28 taken along line XXIX—XXIX of Figure 28.
Figure 27:
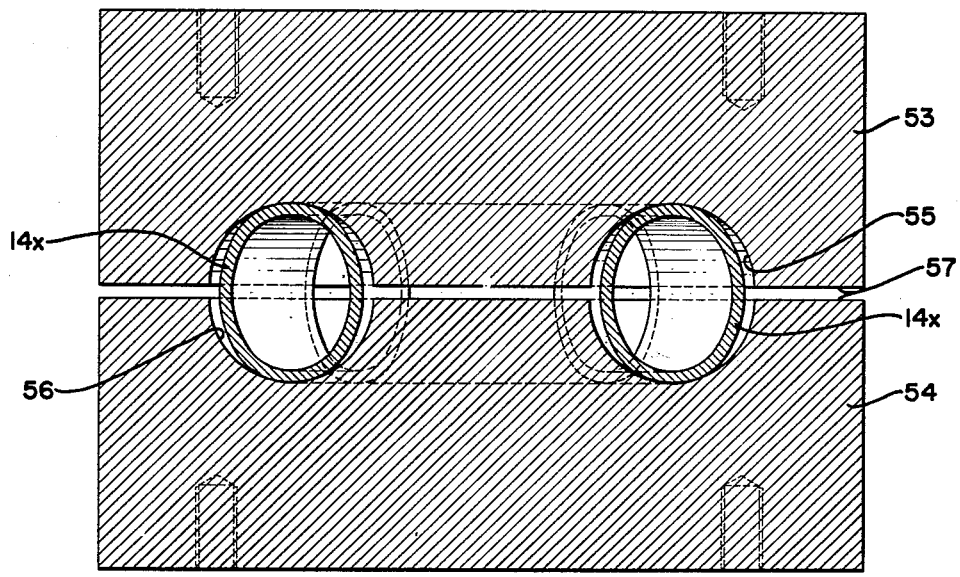
Figure 27 is a view in section taken along line XXVII—XXVII of Figure 26 just prior to closing of the operative parting height of the "rounding" dies shown in Figures 26 and 27.

As illustratively depicted in Figure 28, the ends 19 of length 14 in its form 14x' are free of distortion and substantially normal to axis 22 at the plane of such ends. Consequently, there is relatively no waste or scrap metal produced by my new method and length 14 in its form 14' may be sent directly to an end finishing machine where a flat face 58 and edge bevels 59 may be automatically formed to finish length 14 as a 90° elbow 14' ready for service.

Curved fittings produced by this invention have various advantages hereinbefore described. With some metal compositions, it may be desired to anneal or otherwise temper such newly fabricated finished curved fitting or it may be desired to pickle and passivate the surface of such fittings, such, however, being matters which do not affect this invention. Various modifications and details of this invention may be made without departing from the spirit thereof or the scope of the appended claims.

I claim:

1. In a method of fabricating a curved fitting substantially solely by external shaping of tubular material, the steps comprising, providing a straight length of substantially standard tubular material, die-pressing said length in a direction parallel to a longitudinal vertical median plane therethrough to bow the same about a center of curvature and provide a side with a shorter radius nearer to said center, foreshortening the vertical transverse axis a distance insufficient to substantially change wall thickness along the opposite side farther from said center and lengthening the horizontal transverse axis of said length in said bowing, die-pressing said bowed length in a direction at right angles to said first-named die-pressing to restore the end view shape of said bowed length, foreshortening during said second-named die-pressing the transverse horizontal axis and lengthening the vertical transverse axis of said length resulting from said first-named die-pressing, repeating said sequence of said die-pressing steps with an increase in curvature during the bowing die-pressing steps of said repetition, and proportioning said die-pressing steps to reduce the mean diameter of said length between start and finish of said die-pressing steps by an amount substantially equivalent to from three to four times the mean wall thickness of the final shape of said length, said steps being free of internal mandreling.

2. In a method of fabricating a curved fitting substantially solely by external bending and compression, the steps comprising, providing substantially straight length of round pipe stock, said length having a short radius side and a long radius side, die-pressing said length in a direction parallel to a longitudinal vertical median plane therethrough to bow the same about a center of curvature spaced a lesser distance from said short radius side than the distance from the long radius side of said length, foreshortening the vertical transverse axis without substantially changing wall thickness along said long radius side and lengthening the horizontal transverse axis of said length in said bowing, die-pressing said bowed length in a direction at right angles to said first-named die-pressing to round said bowed length, foreshortening the transverse horizontal axis and lengthening the vertical transverse axis of said length during said second-named die-pressing, repeating said sequence of said die-pressing steps at least once with an increase in such curvature during a bowing die-pressing step of said repetition, said die-pressing steps occurring without material longitudinal restriction of the ends of said length, and limiting the distance of movement of said die-pressing in any of said steps from upset parting height to die closure position to a distance not substantially in excess of the wall thickness of the length being pressed in any such step, said steps being free of internal mandreling.

3. In a method of fabricating a curved fitting substantially solely by external shaping of tubular material, the steps comprising, providing a substantially straight length of hollow cylinder of trapezoidal profile with its ends in oblique planes forming the non-parallel traces of said profile, the opening at said ends having a vertical and horizontal axis respectively, providing a set of mating dies having complementary arcuate recesses therein with their parting line extending side-to-side relative to said length, said dies being mounted for closure movement parallel to said vertical axis to bow said length substantially about a center nearer the shorter side of said profile elements, slightly reducing the height of said length in the course of such bowing without substantially changing wall thickness along the longer side farther from said center, providing a further set of dies having complementary arcuate recesses therein with their parting line extending up-and-down relative to said length, said dies being mounted for closure in a direction parallel to said horizontal axis to restore the end view shape of said length, providing a still further set of dies similar to the first-named set for closure movement parallel to said vertical axis for further bowing of said length with a greater curvature, providing a fourth set of dies similar to the second-named set for closure movement parallel to said horizontal axis, generally reducing the cross-sectional area of said length by compressive upset action of said dies during successive pairs of die-forming steps without enlargement in cross section at any time, the compressive upset action movement of any die-forming step not being in excess of a distance substantially greater than the wall thickness of the length being upset in such last-mentioned step, said steps being free of internal mandreling.

4. In a method of fabricating a curved fitting substantially solely by external shaping of tubular material, the steps comprising, providing a length of hollow cylinder of trapezoidal profile with its ends in oblique planes forming the non-parallel traces of said profile, the opening at said ends having a major and minor axis respectively, providing a set of mating dies having complementary arcuate recesses therein with their respective parting surfaces extending side-to-side relative to said length, said dies being mounted for closure movement parallel to a plane through said major axes to bow said length substantially about a center nearer the shorter side of said profile elements and generally midway between the ends of said elements, slightly reducing the height of said length in the course of such bowing without substantially changing the thickness of the side farther from said center, providing a further set of dies having complementary arcuate recesses therein with their parting surfaces extending up-and-down relative to said length, said dies being mounted for closure in a direction normal to a plane through said major axes to round said length and return the transverse vertical and horizontal axes of said length substantially to equal length, providing a still further set of dies similar to the first-named set for closure movement parallel to a plane through said major axes for further bowing of said length with a greater curvature without substantially changing the thickness of the side along the outside of said curvature, providing a fourth set of dies similar to the second-named set for closure movement normal to a plane through said major axes, generally reducing the cross-sectional area circumscribed by the periphery of said length by compressive upset action of said dies during successive pairs of die-forming steps without enlargement in cross section at any time, the compressive upset action movement of any die-forming step not being in excess of an amount which will reduce the diameter of a circle having such area more than about three-fourths of one to about one wall thickness dimension of the length being upset in such last-mentioned step, the ends of said length being substantially unobstructed in a longitudinal direction during said steps, said steps being free of internal mandreling.

5. In a method of fabricating a curved fitting substantially solely by external shaping of tubular material, the steps comprising, providing a substantially straight length of hollow cylinder of trapezoidal profile with its ends in oblique planes forming the non-parallel traces of said profile, the opening at said ends having a major and minor axis respectively, providing a set of mating dies having complementary arcuate recesses therein with their parting surface extending side-to-side relative to said length, said dies being mounted for closure movement parallel to a plane through said major axes to bow said length substantially about a center nearer the shorter side of said profile elements and generally midway between the ends of said elements, changing the cross section of said length generally to an ellipse in the course of such bowing without substantially changing the wall thickness of the side farther from said center, said first-named arcuate recesses having clearances filled by metal-to-metal contact between the periphery of said first-named arcuate recesses by movement of said first-named parting surfaces from operative parting height to upset parting height, said length being upset by further closure movement of said first-named parting surfaces from upsetting parting height to closure position, providing a further set of dies having complementary arcuate recesses therein with their parting surfaces extending up-and-down relative to said length, said dies being mounted for closure in a direction normal to a plane through said major axes to change the cross section of said length generally from elliptical to circular and return the transverse vertical and horizontal axes of said length substantially to equal length, said last-mentioned arcuate recesses having clearances filled by metal-to-metal contact between the periphery of said length and said last-mentioned arcuate recesses by movement of said last-mentioned parting surfaces from operative parting height to upset parting height, said length being upset by further closure movement of said last-mentioned parting surfaces from upsetting parting height to closure position, providing a still further set of dies similar to the first-named set for closure movement parallel to a plane through said major axes for further bowing of said length with a greater curvature without substantially changing the thickness of the side along the outside of said curvature, providing a fourth set of dies similar to the second-named set for closure movement normal to a plane through said major axes, generally reducing the cross-sectional area circumscribed by the periphery of said length by upset action of said dies during successive pairs of die-forming steps without enlargement in cross section at any time, and repeating additional such pairs of die-forming steps until a curved fitting of final thickness and diameter is formed, the distance from upset parting height to closure in any die-forming step being not substantially greater than the wall thickness of the length being upset in such last-mentioned step, said steps being free of internal mandreling.

References Cited in the file of this patent

UNITED STATES PATENTS

| | | |
|---|---|---|
| 2,285,275 | Harder | June 2, 1942 |
| 2,373,822 | Geppelt | Apr. 17, 1945 |
| 2,500,813 | Fritsch | Mar. 14, 1950 |
| 2,528,315 | Martin | Oct. 31, 1950 |
| 2,612,205 | Seibert | Sept. 30, 1952 |
| 2,675,049 | Martin | Apr. 13, 1954 |

FOREIGN PATENTS

| | | |
|---|---|---|
| 624,227 | Great Britain | Jan. 1, 1948 |